United States Patent
Kilian

(10) Patent No.: US 7,061,311 B2
(45) Date of Patent: Jun. 13, 2006

(54) DIFFERENTIAL AMPLIFIER FOR DUAL BRIDGE TRANSDUCER

(75) Inventor: Wayne T. Kilian, Richardson, TX (US)

(73) Assignee: Honeywell International Inc., Morristown, NJ (US)

( * ) Notice: Subject to any disclaimer, the term of this patent is extended or adjusted under 35 U.S.C. 154(b) by 31 days.

(21) Appl. No.: 10/897,839

(22) Filed: Jul. 23, 2004

(65) Prior Publication Data

US 2006/0017502 A1    Jan. 26, 2006

(51) Int. Cl.
    *H03F 15/00* (2006.01)
(52) U.S. Cl. .......................... 330/6; 330/146
(58) Field of Classification Search ............... 330/146, 330/257, 6; 327/551–554; 361/111, 113
    See application file for complete search history.

(56) References Cited

U.S. PATENT DOCUMENTS

| 4,199,696 A * | 4/1980 | Tanaka et al. ............ 327/359 |
| 5,644,269 A * | 7/1997 | Wong et al. ............... 330/261 |
| 6,195,228 B1 | 2/2001 | Bennett et al. ............ 360/112 |
| 6,581,468 B1 * | 6/2003 | Clifford ....................... 73/715 |
| 6,610,935 B1 * | 8/2003 | Siegel .......................... 177/211 |
| 2002/0089327 A1 | 7/2002 | Spellman |
| 2003/0103302 A1 | 6/2003 | Holman et al. |

FOREIGN PATENT DOCUMENTS

| DE | 2333080 | 1/1975 |
| DE | 28 41 830 B1 | 1/1980 |

OTHER PUBLICATIONS

Munter, P., "Spinning-Current Method for Offset Reduction in Silicon Hall Plates", Delft University Press, Delft, The Netherlands,(1992).

* cited by examiner

Primary Examiner—Robert Pascal
Assistant Examiner—Hieu Nguyen
(74) Attorney, Agent, or Firm—Bradley A. Forrest

(57) ABSTRACT

A plurality of bridge transducers are provided in a dual arrangement. An output terminal from each transducer is coupled to differential inputs of an amplifier. Each of the other outputs from the transducers are respectively coupled together and used to control a bias for dual active loads. The transducers may be implemented within monolithic silicon integrated circuits, using bipolar technology with Hall effect, magnetoresistive or piezoresistive sensing elements for the bridge. A single Hall effect transducer may be coupled to the inputs of the differential amplifier, and a center tap terminal used to control a bias for dual active loads.

11 Claims, 2 Drawing Sheets

DIFFERENTIAL AMPLIFIER FOR DUAL BRIDGE TRANSDUCER

FIELD OF THE INVENTION

The present invention relates to differential amplifiers, and in particular to a differential amplifier for a dual bridge transducer.

BACKGROUND OF THE INVENTION

The Hall effect occurs when a conductor carrying current is placed in a magnetic field. A voltage is generated according to the cross product of the field and flow of current. Sensors operating on the hall effect can be modeled like a Wheatstone bridge. Opposite ends of the bridge are coupled to a differential amplifier to provide an output. It is common to use a plurality of these transducers electrically connected in a parallel arrangement and physically oriented in a common centroid manner to provide cancellation of offset errors that are common to the individual bridges.

SUMMARY OF THE INVENTION

Bridge transducers are provided in a dual arrangement. An output terminal from each transducer is coupled to differential inputs of an amplifier. Each of the other outputs from the transducers are respectively coupled together and used to control a bias for active loads.

In further embodiments, PNP transistors are used at inputs, and NPN active loads to provide higher gain, but lower input impedance. A plurality of transistors in parallel at the inputs may be used to provide lower noise and offset, and a cascode current mirror may be used for the active loads to provide higher gain. The transducers may be implemented within monolithic silicon integrated circuits, using bipolar technology with Hall effect, magnetoresistive or piezoresistive sensing elements for the bridge.

In still a further embodiment, a single Hall effect transducer is coupled to the inputs of the differential amplifier and control of the bias for the active loads is provided via a center tap.

DETAILED DESCRIPTION OF THE INVENTION

In the following description, reference is made to the accompanying drawings that form a part hereof, and in which is shown by way of illustration specific embodiments in which the invention may be practiced. These embodiments are described in sufficient detail to enable those skilled in the art to practice the invention, and it is to be understood that other embodiments may be utilized and that structural, logical and electrical changes may be made without departing from the scope of the present invention. The following description is, therefore, not to be taken in a limited sense, and the scope of the present invention is defined by the appended claims.

Figure 1:
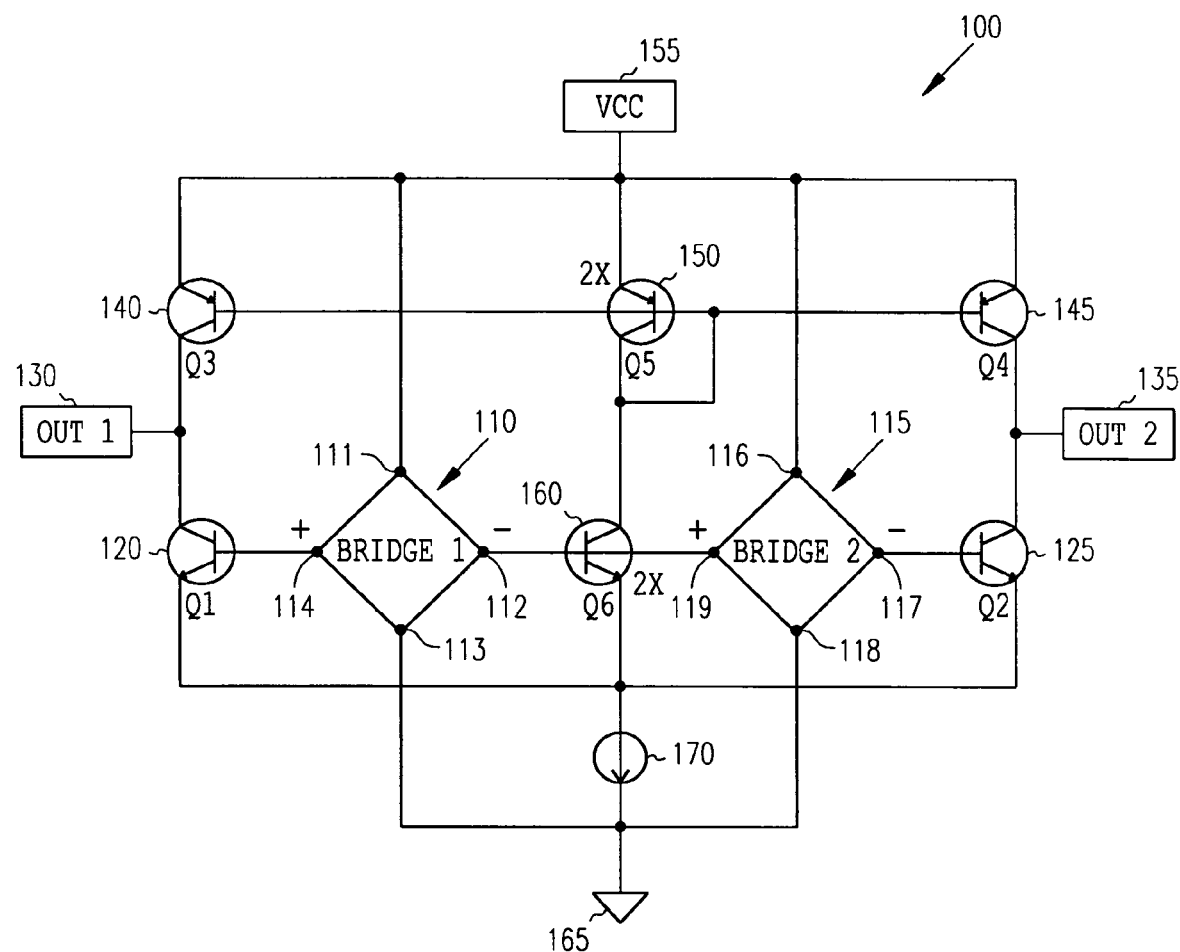
FIG. 1 is a circuit diagram of a dual bridge transducer differential amplifier according to an embodiment of the invention.

A circuit indicated generally at 100 in FIG. 1 has a first bridge transducer 110 comprising two output terminals 112 and 114, and two bias terminals 111 and 113. The bridge is a Hall effect transducer in one embodiment, but may also be any other type of Wheatstone bridge, such as a magnetoresistive or piezoresistive sensing element. The bridge may be a single bridge, or plurality of parallel bridges. A second bridge transducer 115 comprises two output terminals 117 and 119, and two bias terminals 116 and 118. The bridge may be a single bridge, or plurality of parallel bridges. Three of the terminals of each of the transducers 110 and 115 are respectively coupled to each other. Output terminals 112 and 119 of the transducers are of opposite polarity, and are coupled to each other. Bias terminals 111 and 116 are coupled to each other, and bias terminals 113 and 118 are also coupled to each other.

The remaining outputs of the transducers 110 and 115 are respectively coupled to a differential amplifier comprising transistors 120 and 125. Output 114 of bridge 110 is coupled to the base of transistor 120, and output 117 of bridge 115 is coupled to the base of transistor 125. The collector of transistor 120 is coupled to a first output 130. The collector of transistor 125 is coupled to a second output 135. The outputs are also coupled to respective loads 140 and 145. In one embodiment, loads 140 and 145 are active loads comprising transistors having collectors coupled to the outputs 130 and 135.

Bases of the active loads 140 and 145 are tied together, and feed into the base of a current mirror reference 150. The current mirror reference 150 has its collector tied to its base, and has an emitter coupled to a supply voltage VCC at 155. The emitters of the active loads 140 and 145 are also coupled to VCC, as are bias terminals 111 and 116 of the bridge transducers. The collector of current mirror reference 150 is scaled to have a particular transconductance ratio with respect to each of the active load transistors 140 and 145, said transconductance ratio being approximately equal to the transconductance ratio resulting from scaling of transistor 160 with respect to each of the differential amplifier transistors 120 and 125. In one embodiment, the current mirror reference 150 comprises two parallel coupled transistors each having the same size and structure as each of the active load transistors 140 and 145, with transistor 160 comprising two parallel coupled transistors each having the same size and structure as each of the differential amplifier transistors 120 and 125, to provide improved matching of the transconductance ratios. Current mirror reference 150 comprises a PNP transistor, as are active loads 140 and 145. Other transistors are NPN transistors in one embodiment. Other combinations of transistors may be used as desired.

Outputs 112 and 119 are also coupled to the base of a transistor 160. The collector of transistor 160 is coupled to the base and collector of current mirror reference 150, and the emitter of 160 is coupled to a current sink 170. The emitters of transistors 120 and 125 are also coupled to current sink 170.

In operation, an output terminal from each transducer is coupled to differential inputs of the amplifier. Each of the other outputs from the transducers are respectively coupled together and used to control a bias for the active loads. Transistors 140, 145 and 150 act as a dual current mirror. Transistor 160 provides an input current to the current mirror that is proportional to the sum of the collector currents flowing in transistors 120 and 125. The sum of the collector currents of active load transistors 140 and 145 is approximately equal to the sum of collector currents of amplifier transistors 120 and 125, the equality of these currents comprises a self consistent bias providing a large dynamic range and wide operating VCC range. In one embodiment, the differential amplifier voltage gain is approximately the Early voltage of the active load transistors 140 and 145 divided by the thermal voltage, independent of current sink 170 on a first order.

In a further embodiment, PNP transistors are used at the inputs from the bridges, and NPN active loads are provided. This provides higher gain, but lower input impedance. Circuit 100 may be formed in monolithic silicon integrated circuits, using bipolar technology with Hall effect, magnetoresistive or piezoresistive sensing elements.

Figure 2:
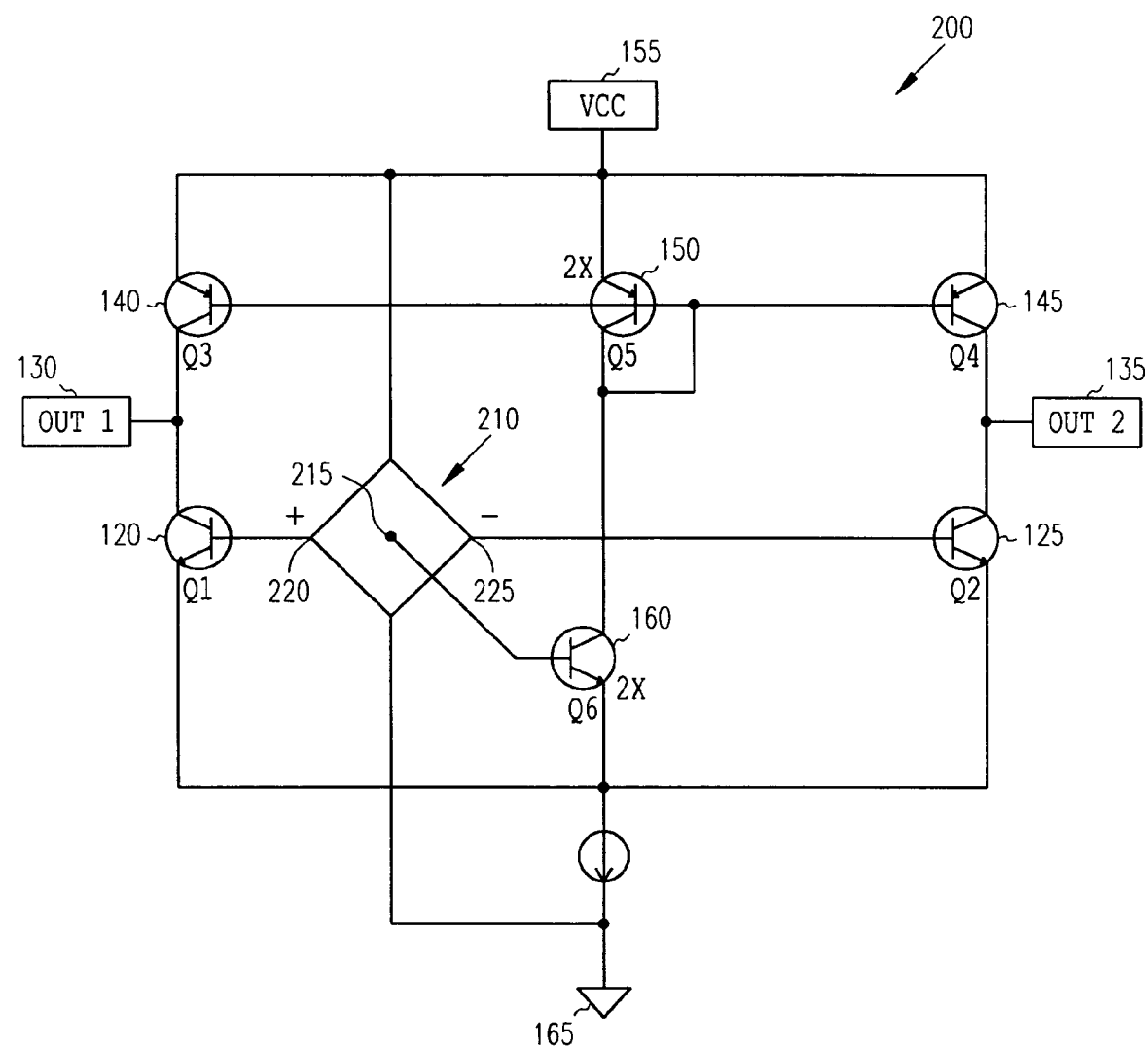
FIG. 2 is a circuit diagram of a center tapped bridge transducer amplifier according to an embodiment of the invention.

An alternative circuit 200 is shown in FIG. 2, with like elements numbered consistently with corresponding elements in FIG. 1. A Hall transducer 210 has a center tap 215 coupled to the base of double-wide transistor 160. The center tap 215 operates to provide an input similar to the combined inputs from outputs 112 and 119 of the pair of bridges in FIG. 1. Hall transducer 210 may be a single element, or a plurality of elements in parallel. The center tap 215 is kept small in one embodiment to minimize the shorting effect on the Hall transducer 210.

CONCLUSION

A self-referenced bias and active loads produce a fully differential, high gain, bias insensitive amplifier for bridge transducers using only six transistors and a current source. The differential amplifier divides the plurality of transducers into a dual arrangement. One output terminal from each transducer is connected to the differential inputs of the amplifier with each of the other transducer outputs connected together and used to control the bias for the active loads. Parallel transducers may be used in some embodiments. In a further embodiment, cascode current mirrors are used for the active loads to provide higher gain.

In one embodiment, the differential amplifier described divides the plurality of transducers into a dual arrangement. For example: a pair of single transducers or a pair of paralleled transducers. One output terminal from each transducer of the dual arrangement is connected to the differential inputs of the amplifier with each of the other transducer outputs connected together and used to control the bias for the active loads. Variations on this circuit include but are not limited to: using PNP transistors at the inputs and NPN active loads (higher gain but lower input impedance), using a plurality of transistors in parallel at the inputs (lower noise and offset), using cascode current mirrors for the active loads (higher gain). The preferred embodiment is to apply this circuit within monolithic silicon integrated circuits, using bipolar technology with Hall effect, magnetoresistive or piezoresistive sensing elements.

The invention claimed is:

1. A circuit comprising:
a first bridge transducer having two outputs and two bias terminals;
a second bridge transducer having two outputs and two bias terminals; and
a differential amplifier having a first input coupled to one output of the first bridge transducer and having a second input coupled to one output of the second bridge transducer, wherein each of the other outputs of the first and second bridge transducers are respectively coupled to each other;
active loads coupled to the differential amplifier;
an active load reference coupled to the active loads; and
a first transistor having a base coupled to an output of each of the first and second bridge transducers and a collector coupled to the active load reference.

2. The circuit of claim 1 wherein the differential amplifier comprises a pair of transistors having collectors, and wherein the first transistor provides a current to the active load reference that is equal to the sum of collector currents in the differential amplifier.

3. A circuit comprising:
a first bridge transducer having two outputs and two bias terminals;
a second bridge transducer having two outputs and two bias terminals;
a differential amplifier having a first input coupled to one output of the first bridge transducer and having a second input coupled to one output of the second bridge transducer, and wherein each of the other outputs of the first and second bridge transducers are respectively coupled to each other;
load transistors are coupled to the differential amplifier;
an active load reference coupled to the load transistors; and
a first transistor having a base coupled to an output of each of the first and second bridge transducers and a collector coupled to the active load reference.

4. The circuit of claim 3 wherein the differential amplifier comprises a pair of transistors having collectors, and wherein the first transistor provides a current to the active load reference that is equal to the sum of collector currents in the differential amplifier.

5. A circuit comprising:
a first bridge transducer having multiple outputs;
a second bridge transducer having multiple outputs; and
a differential amplifier having a first input coupled to one output of the first bridge transducer and having a second input coupled to one output of the second bridge transducer;
active loads coupled to the differential amplifier, wherein the other outputs of the first and second bridge transducers provide bias control for the active loads.

6. The circuit of claim 5 and further comprising cascode current mirrors for the active loads.

7. A circuit comprising:
a Hall effect transducer having two outputs and two bias terminals;
a differential amplifier having a first input coupled to a first output of the Hall effect transducer and a second input coupled to a second output of the Hall effect transducer;
active loads coupled to the differential amplifier; and
a center tap coupled to an approximate center of the Hall effect transducer to provide a bias to the active loads.

8. The circuit of claim 7 and further comprising an active load reference coupled to the active loads.

9. The circuit of claim 8 and further comprising a transistor having an emitter area twice as large as the emitter area of each transistor of the differential amplifier, a base coupled to the center tap, a collector coupled to the active load reference, and an emitter coupled to a current sink.

10. A circuit comprising:
a Hall effect transducer having two outputs and two bias terminals;
a differential amplifier comprising a first transistor having a base coupled to a first output of the Hall effect transducer and a second transistor having a base coupled to a second output of the Hall effect transducer;

a pair of active load transistors coupled to the first and second transistors of the differential amplifier;

an active load reference transistor coupled to the active loads; and a center tap coupled to an approximate center of the Hall effect transducer to provide a bias to the active load reference.

11. The circuit of claim 10 and further comprising a transistor having an emitter area twice as large as the emitter area of each transistor of the differential amplifier, a base coupled to the center tap, a collector coupled to the active load reference, and an emitter coupled a current sink.

* * * * *